United States Patent [19]

Downing et al.

[11] Patent Number: 4,725,357
[45] Date of Patent: Feb. 16, 1988

[54] REMOVING SELENIUM FROM WATER

[75] Inventors: Anthony L. Downing, Welwyn; Brian G. Hoyle, Leighton Buzzard; Rodney C. Squires, South Godstone; Anthony N. James, Royston, all of England

[73] Assignee: EPOC Limited, London, England

[21] Appl. No.: 884,390

[22] Filed: Jul. 11, 1986

[30] Foreign Application Priority Data

Jul. 11, 1985 [GB] United Kingdom ............... 8517531
Jan. 24, 1986 [GB] United Kingdom ............... 8601763
May 28, 1986 [GB] United Kingdom ............... 8612919

[51] Int. Cl.$^4$ .......................... C02F 3/28; C02F 3/34
[52] U.S. Cl. .................................... 210/611; 210/603; 210/911; 210/617; 210/912
[58] Field of Search .............. 210/611, 911, 912, 605, 210/603, 903, 615–618, 610

[56] References Cited

U.S. PATENT DOCUMENTS

| | | | |
|---|---|---|---|
| 4,183,809 | 1/1980 | Klapwijk et al. | 210/903 |
| 4,200,523 | 4/1980 | Balmat | 210/611 |
| 4,505,819 | 3/1985 | Barnes et al. | 210/603 |
| 4,519,912 | 5/1985 | Kauffman et al. | 210/611 |
| 4,519,913 | 5/1985 | Baldwin et al. | 210/611 |

FOREIGN PATENT DOCUMENTS 54-52863  4/1979  Japan ................................ 210/611

Primary Examiner—Benoit Castel
Attorney, Agent, or Firm—Fulwider Patton Rieber Lee & Utecht

[57] ABSTRACT

Dissolved selenium is removed from water by treatment in a reactor containing microbial biomass to cause the hexavalent selenium to be converted to forms of selenium which can be readily removed from the water, and causing or allowing the removable forms of selenium to be removed from the water. Examples of removable forms of selenium include volatile organic selenium compounds, volatile inorganic selenium compounds, elemental selenium, entrainable organically-complexed selenium compounds, entrainable tetravalent selenium compounds, and entrainable bivalent selenium compounds. The volatile selenium compounds can be removed and recovered as a gas, while the entrainable forms of selenium can be entrained by larger particles and separated off, for example by filtration.

17 Claims, 2 Drawing Figures

REMOVING SELENIUM FROM WATER

BACKGROUND OF THE INVENTION

The present invention relates to the removal of selenium from water, and more particularly but not exclusively to the treatment of drainage water containing selenium leached from soil.

Selenium is often present in water at concentrations of up to 0.5 mg/l, but a concentration of this order is undesirable for purposes such as drinking water or crop irrigation. For example, in the USA, the permitted maximum selenium level for drinking water is set at 10 $\mu$g/l. In some selenium-containing waters such as certain irrigation drainage waters, a substantial proportion of the selenium is present as the selenate anion, $[SeO_4]^{-2}$. These waters are especially difficult to treat because there is also a very high concentration of sulphate.

In the USA, particular attention has focussed on treatment of the agricultural drainage water in the San Joaquin Valley. This Valley has about 1.1 million acres of extremely productive land which is under irrigation. The land is generally low-lying and requires drainage in order to avoid high salinity in crop root zones. A major scheme to drain off subsurface water after use for irrigation has been frustrated by discovery of high levels of contaminants. The drainage water is brackish, and has a relatively high concentration of salts and potentially toxic elements, with selenium representing a particular problem. Environmental concern has led to a suspension of construction work, a closure order on a large reservoir, and an extensive program of drain plugging. With the plugging of the drains, the water table is beginning to rise, causing concern for growers in the Valley.

Methods are available for the purification of water, but in general the known methods are not suited for use on a large scale with brackish drainage water containing selenium and a range of other contaminants. Reverse osmosis is costly, and so also is ion exchange. In this respect, it is to be borne in mind that the initial aim in treating the drainage water in the San Joaquin Valley and elsewhere is to render it suited for discharge. Hence, an economic process is paramount.

Methods are also described in the literature which are specifically concerned with the removal of selenium from water, but it is not apparent that such methods can be used economically on a large scale.

U.S. Pat. No. 4,405,464 describes a process for the removal of selenium by a chemical treatment involving reduction of Se(VI) to Se(IV) using metallic iron which is itself oxidized and forms ferric hydroxide which then entrains the reduced selenium.

An article by Smith and Wiechers in Water SA (1981) 7, 65 describes elimination of toxic metals from waste water by an integrated wastewater treatment/water reclamation system. The system relies upon a combination of biological and chemical processes, including a bacteriological denitrification, clarification through formation of ferric hydroxide, and an anaerobic digestion.

An article by Gersberg and Elkins in Proceedings of Symposium on Selenium in the Environment, Cal. State University, Fresno, June 10-12, 1985, describes selenium removal using an immobilized cell reactor containing Pseudomonas species immobilized in alginate. A selenium medium containing 1975 mg/l of selenium was recirculated through the reactor to give a final concentration of 1180 mg/l selenium. In further experiments with the Pseudomonas, removal efficiencies of 44 and 68% were achieved.

OBJECTS OF THE INVENTION

The primary intention of the present invention is to provide a method for removing selenium from water, in the sense of wholly or significantly reducing the selenium level. Especially desired is the removal of selenate from water containing high levels of sulphate, and in particular a method which may be operated economically on a large scale.

A more specific object is to provide a method of water treatment which might be adopted to remove selenium and other contaminants from drainage water such as occurs in the San Joaquin Valley.

SUMMARY OF THE INVENTION

The present invention resides in a method for removing dissolved selenium from water. The method involves treating the water in a reactor containing a microbial biomass in which reducing activity can occur. The method is operated to cause the selenium to be converted to forms of selenium, including elemental selenium, which can be captured or entrained by larger particles. The discharge from the reactor can then be processed to remove particles with captured selenium. Conversion of the selenium to filterable form is accompanied by conversion to volatile selenium compounds, typically including hydrogen selenide and methyl selenide. Such compounds can also be eliminated from the discharge of the reactor.

Thus, it has unexpectedly been discovered that biological treatment can readily convert dissolved selenate in a way which leads to massive reductions in the selenium level. The present method derives from an empirical discovery, and was not predicted.

By adoption of the present invention, it becomes possible to treat selenium-containing water to eliminate selenium, and other toxic elements, giving a water which is more readily managed for disposal or re-use. Indeed, a preliminary evaluation of a pilot plant installed in the San Joaquin Valley to treat contaminated water indicates that the present invention can yield a water, albeit a salty water, which could be discharged safely either to evaporation ponds or to salt water sinks. The inclusion of a sulphate-removal step, and further processing for desalting, can give a treated water which is acceptable for re-use.

The method of the invention is potentially more economic than alternatives known to the Applicants. The majority of the selenium can be removed and the water purified.

DESCRIPTION OF THE PREFERRED EMBODIMENTS

The water to be treated by the process of this invention is preferably supplied to the reactor supplemented with a nutrient for the biomass, especially an assimilable carbon source. The water is suitably supplied in the substantial absence of free oxygen such that biological conversion proceeds anaerobically or anoxically. The reactor can take the form of a single- or multi-stage reactor, with suitable reactor types including fixed-bed reactors, fluidised-bed reactors, sludge-blanket reactors, and stirred reactors.

After carrying out the biological conversion, the selenium is in different forms, including selenium which has become organically bound (probably in the form of a soluble complex compound), selenium which has in some way been captured by larger particles, selenium which has been captured in some way by the biomass retained in the reactor, and typically also selenium in the form of volatile organic and inorganic compounds. The selenium which has been captured by larger particles is removed, for example by filtration, as discussed in more detail below. The volatile selenium compounds are caused or allowed to escape as gas from the water, suitably to a contained environment for safe disposal or recovery.

More specifically, in a preferred aspect, this invention resides in a method of removing dissolved hexavalent selenium from water in order to yield a purified water. The method suitably comprises treating the selenium-containing water in a reactor containing microbial biomass and a nutrient for the biomass, substantially in the absence of free oxygen, to cause at least part of the selenium to be captured by particles having a size of 0.1 micron or greater; and passing the discharge from the reactor through a filter in order to filter out particles which captured the selenium. The instant method is suited for removing dissolved hexavalent selenium from water which contains a higher weight concentration of nitrate than of hexavalent selenium (measured as selenium). In such a process, the concentration of nitrate in the water is lowered from say between 25 and 250 mg/l (measured as nitrogen,n typically between 50 and 200 mg/l nitrate, to 5 mg/l or below, typically 2 mg/l or less; and the water is treated in a reactor containing microbial biomass to remove selenium. The lowering of the nitrate concentration can be effected using biomass, which may be the same biomass which is employed to remove selenium.

Furthermore, the instant method is especially suited for removing dissolved hexavalent selenium from water which contains a high concentration of sulphate, for example 500 to 10,000 mg/l (measured as $SO_4$), typically 2500 to 5000 mg/l sulphate.

The method of the present invention is particularly intended for use in treating water which contains at least 0.5 mg/l selenium. Indeed, the water can contain at least 0.5 mg/l, and typically around 0.2 to 0.5 mg/l of selenium. The method of this invention can readily lower the selenium level to a more environmentally acceptable level. The selenium level is typically lowered to 10% or less of the original valve, with 5% or less being preferred. For example, a selenium level of around 0.3 MG/L can be lowered to around 30 microg/l (that is, about 10% of the original value) using a suitably designed and operated reactor. A final treatment, for example with an ion exchange resin, can be employed to achieve the standard of 10 $\mu$g/l.

The reaction mechanism of the present process is not known, though it is possible that during fermentation extra-cellular amino acids form organic complexes with the selenium and these are subsequently assimilated by the microorganisms in the biomass. Precipitation or co-precipitation may also occur. Thus the particles might contain one or more organic complexes, some of which may be in suspension or some in solution, or in general complex molecules or molecules with the selenium compounds absorbed or adsorbed on the surface, or colloidal particles, or rather larger microbial debris. The particles held back in a filter gave no reaction to the normal test for selenate ions, and had to be oxidised with acidic potassium permanganate in order to reform selenate ions. A proportion of the particles appeared to pass through a normal laboratory filter paper, even if the filter paper was first covered with precipitated aluminium hydroxide, special filters being required to remove this fraction of the selenium in reactor effluent.

The term "particles" is used in a general sense and includes particles which are invisible under the optical microscope, for example large molecules, and in this sense the above mentioned soluble complex compounds will also be particles. However, more specifically, as particles having a size of below very roughly 0.1 micron can pass through most practicable physical filters, the particles concerned may have a size of very roughly 0.1 micron or greater so that it is found satisfactory to use a filter of this retention size (though this is very imprecise). More generally, a minimum particle size of 10 microns, especially 1 micron, is desirable.

In the present process, the reactor can be operated so that sulphate is not removed or reduced. This is in spite of the fact that in drainage waters there may be at least 500 mg/l sulphate (measured as sulphate) and up to 12,000 times more sulphate than selenate. The process may be workable because in effect the selenate is attacked before the sulphate. Indeed, without being bound by theory, the presence of selenate in the water might exert a control on the redox reactions likely to occur in the biomass.

Selenate is a known competitive inhibitor of sulphate reduction, having a 40-fold greater affinity for the enzyme uptake system than the natural substrate, sulphate (Postgate J. R. (1984) The Sulphate-Reducing Bacteria, Cambridge University Press). This inhibition can confer certain advantageous features on the process as operated. If significant sulphate reduction is prevented then it is unlikely that the redox potential will drop sufficiently to make it advantageous for the bacteria to use Se(VI) as a hydrogen dump (Huang et al. (1982) Can. Tech. Rep. Fish. Aquat. Sci. 1163; and see also Jones et al. (1984) FEMS Microbiol Lett. 21, 133–36). The more mobile Se(IV) will not, therefore, be produced, and any interactive mechanism with bacteria is more likely to involve organic matter complexation and mobilization.

If desired, a sulphate removal step can be included in the process, after removal of selenium. Typically such sulphate removal can be achieved through anaerobic digestion to give insoluble sulphides and hydrogen sulphide.

The growth of the biomass needs to be promoted, typically by supplementing the selenium-containing water with nutrient. The nutrient feed can be incorporated in the water to be treated, or can be in a separate feed to the reactor. The nutrient can include an assimilable carbon source, such as a suitable readily biodegradable organic compound, for example methanol, ethanol, sodium lactate, or a type of mixture of materials that may be present in many strong organic wastes. Some assimilable nitrogen and phosphorous may have to be added in order to generate and sustain the necessary biochemical activity, if they are not already sufficiently present in the water to be treated. The method ideally should be operated so that there is practically no nitrate-nitrogen nor organic nutrient left at the outlet. In the case of nitrate this appears to be desirable both for promoting removal of selenium, as well as for reducing the polluting potential of the final effluent due to nitrate per se. Remaining organic nutrient can be removed by well known methods, such as aerobic fermentation or, in the case of volatile nutrients, air-stripping.

In general terms, the bacterial biomass will be heterotrophic but will not be of a specific strain and is unlikely to be a pure culture; it will merely contain organisms growing from natural contamination, at least initially. Suitable bacteria are likely to include strains belonging to the genera Hyphomicrobium, Corynebacterium, Salmonella, Pseudomonas and Bacillus. There is no absolute need for special seeding of the reactor (owing to the presence of microbial organisms), but in practice it is possible to save time by seeding with sludge from a sewage treatment plant, preferably from an anoxic nitrate-removing reactor or an ordinary activated sludge reactor.

The bacteria will normally be tolerant of at least 1 mg/l of selenate, and probably be faculative anaerobes. If desired, suitable strains of bacteria can be selected by obtaining them from selenium-rich environments, such as selenium-polluted waters, but in practice this selection is not necessary. Thus, a naturally occuring mixed flora such as occurs in sewage sludge provides an adequate source of bacteria: operation of the present method with supply of a selenium-containing water will lead to natural selection and growth within the reactor.

The reactor is preferably operated with no free or dissolved oxygen being present, oxygen only being available in combined form. There may be some oxygen initially, dissolved in the water. No coagulants or floculants, such as ferric chloride, need be added. A reducing agent, such as ferrous sulphate, hydrazine, sodium sulphide or sodium sulphite, could be introduced, preferably after the initial zone or for instance between two separate vessels defining different stages.

The throughput of the reactor will normally be selected to give loadings which are low enough to ensure that little nitrate penetrates through the reactor and also that there is a sufficient growth of faculative biomasss to convert the selenium. Since the maximum rate of growth of biomass is limited by the nitrate content of the feed, it may occasionally be necessary to add nitrate (and a corresponding complement of organic nutrient) to maximize the biomass. This can be facilitated by operating in two stages, the performance of the first stage giving guidance for "tuning" the second.

Although it is preferred to remove nitrates in an anaerobic or anoxic reactor, the nitrates can be removed in any suitable way prior to removing the selenium. It seems that the nitrate concentration must be relatively low (say 5 mg/l or less) before the selenium is converted. Nonetheless, selenium removal is possible before all the nitrate has been removed. There appears to be no definite upper limit to the content of nitrate that is acceptable in the feed water but it is advantageous to balance flows so that this concentration is at a reasonable uniform average of those likely to be encountered.

When operating a single-stage fixed-bed reactor in which the support medium is inert (such as gravel or crushed rock) it appears that unless there is less than around 1 mg/l of nitrate (measured as nitrogen) at the outlet from the reactor, there will be little conversion of the selenium to removable forms. The limit of 1 mg/l nitrate concentration has not been accurately determined, and can vary greatly according to the materials and conditions in the reactor. For instance, when using steel wool as the support, a nitrate concentration of 5 mg/l (measured as nitrogen) at the outlet can be tolerated (the total dissolved selenium concentration in the effluent being acceptable, say 0.014 mg/l (14 $\mu$g/l))—the acceptable nitrate concentration may be even higher. If the nitrate concentration at the outlet is too high but there is adequate organic nutrient present, reduction in the rate of flow through the reactor normally allows the conversion of selenium to proceed.

In the preferred arrangements, one, two or three reactor stages are used for the selenium removal, or nitrate removal and selenium removal.

The preferred form of reactor has a fixed bed of support material. Initially it was found that when steel wool was used as the support in the reactor, the reaction rates appeared to be faster, the overall removal greater, and nitrate tolerance greater. Consumption of the steel wool was observed, and so the method may have to be operated using reactors in parallel, one of which is being used and the other of which is being reloaded. Some of the iron thus goes into solution, but can be removed by for example a cross-flow filter. The effect of the iron remains uncertain, but it may act as a catalyst or may decrease the redox potential. Thus it may be possible to use other reducing agents, either in the form of solids or possibly as solutions injected into the feed to the first or second reactor stages.

The physical arrangement of the iron need not be that of steel wool, so long as the shape provides a high specific surface (high surface/volume ratio)—thus steel scrap or swarf may be usable. Relative to conventional universal media (e.g. gravel, rock, slag), some improvement would be expected from substrates such as plastic filaments which provided a higher specific surface to which the biomass would adhere.

For a fixed-bed reactor, in place of steel the support medium can be a substantially inert, inorganic wool such as glass wool or rock mineral fibre wool. The wool fibre diameter is preferably from 3 to 20 $\mu$m and a preferred packing density is from 70 to 300 kg/m$^2$. To date, the preferred diameter and packing density were about 10 $\mu$m and about 230 kg/m$^2$ bed volume.

Materials other than steel and glass wool or rock mineral fibre wool can be used for the support of the biomass in fixed-bed reactors; in general, it is merely desired that a combination of large specific surface and adequate void space should be provided. The void space suitably amounts to 20 to 40%, for example 25 to 35%. Further examples of currently preferred support materials include stones, for example stones of 0.5 to 4, especially 1 to 3 inches (say, 1.25 to 10, especially 2.5 to 7.5 cm).

It is possible that the selenium removal occurs efficiently because the preferred bed is not homogeneous. In a packed bed, which is not homogeneous, there will be various levels of reducing activity (redox potential) within the bed. In other words, there is probably a plurality of zones in which different reactions take place in the reactor. For reasons already indicated it is most convenient to use a two- or more stage reactor (with separate vessels defining the stages). With an inert-bed reactor, the nitrate apparently has to be removed first in order for selenium to be converted, and the initial stage can be operated for the most efficient nitrate removal to allow selenium conversion then to take place. The subsequent stages can be manipulated to grow further biomass to maximise conversion, especially entrainment or capturing in the form of suspended particles. Additional feed can be provided to the second stage. This feed can include nitrate, which does not reverse previous reactions in which selenium was captured but allows further growth of biomass, and thus allows improved capturing to take place.

Fluidised-bed reactors, sludge-blanket reactors, stirred reactors and other reactor types can be used to carry out the process, as alternatives to fixed-bed reactors.

Any of the reactor stages may be in the form of fluidised beds using a particulate material for example on which the biomass forms a coating. Normally, upward-flow beds would be used (particulate material heavier than water), though it is possible to use downward-flow beds (particulate material lighter or heavier than water). In experimental work, a six inch diameter (150 mm) fluidised bed was used for fluidising, with sand as the particulate material. In order to recover the particulate material which is carried over, the arrangement used at the Coleshill, England, experimental plant may be used, as reported in the Paper "Sand/Biomass Separation with Production of a Concentrated Sludge" by Cooper et al., presented at a Water Research Centre/UMIST conference entitled "Biological Fluidised Bed Treatment of Water and Wastewater" at Manchester, Apr. 14–17, 1980. However, fluidising has advantages and disadvantages, one disadvantage being the extra power required. Continuously-stirred reactors may be just as economic in practice.

Cross-flow or other filtration can be used to produce concentrated biomass after selenium removal. A preferred type of filter is a cross-flow microfilter, preferably with an aluminium hydroxide or zirconium hydroxide membrane, for instance as described in PCT specification PCT/GB86/00143 and corresponding patent applications claiming priority of GB Patent Application No. 8506350. It has been noted that selenium included in larger particles such as microbial debris is retained on a sand filter. It therefore appears possible to operate the method so that the major part of the non-volatile selenium is included in such debris or in general in suspended particles, in which case a simple sand filter or filter of equivalent size can be used.

The concentrate from the filter can be passed back into the selenium-removal reactor. This enables one to raise the concentration of biomass (expressed as a percentage weight per unit volume, the biomass being weighed dry) in the reactor. For example, in a reactor in which biomass is separated by settlement, the concentration is usually limited to about 0.06%, and using cross-flow microfiltration for the return of concentrate in a third reactor, the concentration may be 4% and probably higher; in the latter case, large proportions of sludge are recirculated in the concentrate.

It has been noted that nitrogen bubbles in the reactor, and in theory the nitrogen may contain some hydrogen selenide. It may be possible (especially by addition of suitable reducing agents to the feed) to operate the method so that most of the selenium comes off as hydrogen selenide. In such circumstances, none of the selenium, or only a small proportion of the selenium, would be included in larger particles, and the filtration or equivalent separation step might be eliminated. Equally, elimination of the separation step might apply to the production of volatile organic selenium compounds.

It is believed that the filtered outflow can be further treated by aeration with activated-sludge fed with a sugar such as glucose (or any suitable biodegradable organic compound) as a nutrient, to further reduce the dissolved selenium.

Accordingly, the invention also provides a method of removing selenium from water by treating the selenium-containing water in a single- or multi-stage reactor containing microbial biomass and a nutrient for the biomass, in the substantial absence of oxygen, and then treating the water in a single- or multi-stage reactor containing microbial biomass and a nutrient for the biomass, in the presence of oxygen. As above, the discharge from the end reactor can be filtered, and the discharge from the each preceding reactor will normally be filtered.

Subsequent to selenium removal, further steps are possible, particularly if other contaminants are present. Ion-exchange can be used for a polishing, for instance for boron removal. It is also possible to arrange for boron to be removed in cross-flow filtration using suitable membranes.

The selenium itself (elemental or compounds thereof) is a useful byproduct of the invention.

Applying the principle of the invention, it is also possible to reclaim selenium compounds from organically-complexed mixtures in sludge from treatment plants or from reservoirs; specifically in the latter case, this enables mud on the bottom of the reservoir to be purified of selenium, and the selenium itself can be recomplexed using the invention and recovered as a selenium-rich sludge or as selenium compound.

THE EXAMPLES

The present invention will now be illustrated by reference to some non-limiting Examples, in which reference is made to the accompanying drawings.

DESCRIPTION OF THE DRAWINGS

Referring to FIG. 1, selenium-containing water from conduit 1 supplemented with methanol-based nutrient from conduit 2 pass through two identical reactor stages 3, 4 (same cross-section and same contents), preferably with no recyling of feed water, and thence through a small reactor 5, a pump 6 and a cross-flow microfilter 7. Purified water is discharged through conduit 8 and concentrate for waste disposal is discharged conduit 9, part of which can be returned as active biomass through a return line 10 to the reactor 5.

Figure 1:
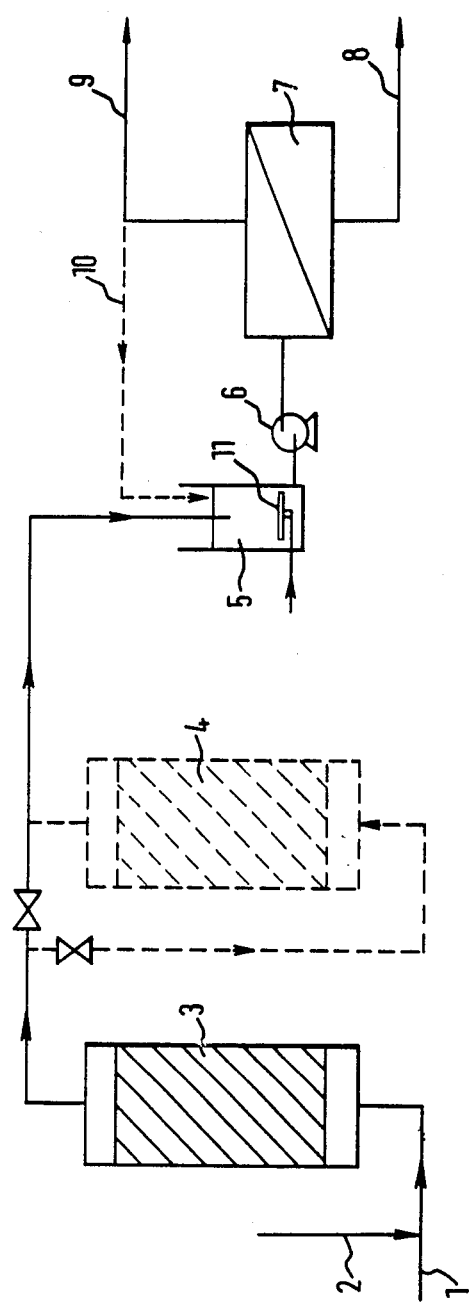
FIG. 1 is a schematic diagram of a plant for carrying out a method in accordance with the invention.

The reactor stages 3, 4 are fixed film reactors and are filled near to the top with approximately 1 inch (2.5 cm) gravel (40% void space). The up-flow mode is preferred, as shown. The stages 3, 4 and the reactor 5 are seeded with activated sludge prior to start-up. The stages 3 and 4 are operated anaerobically or anoxically. The reactor 5 has a sparge tube 11 for the addition of air in order to strip off surplus methanol supplied in the nutrient. The reactor 5 thus contains aerobic activated sludge.

As indicated by the valving, the stage 4 may be by-passed if the selenium content is considered to be sufficiently low at the outlet from the stage 3. Alternatively, the stage 4 may be omitted altogether.

Figure 2:
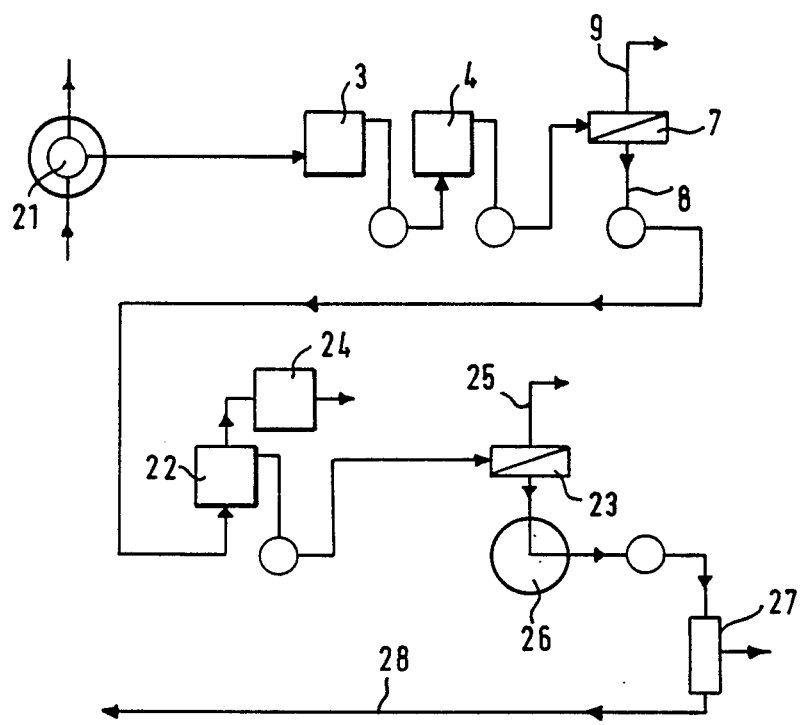
FIG. 2 is a schematic diagram of a another plant for carrying out a method in accordance with the invention, where removal of sulphate and boron is desired as well as removal of selenium.

Referring now to FIG. 2, like references are used for like parts. Pumps are indicated throughout as plain circles. Effluent is abstracted from a main drain 21 and is passed through biological reactor stages 3, 4 in series. These can be fixed film reactors as in FIG. 1, or one or both of them can be stirred reactor or a fluidised bed reactor. The outflow from the stage 4 is filtered in a cross-flow microfilter 7. The selenium concentrate is fed through conduit 9 and the liquid passing through the filter 7 is pumped into a reactor 22. At some point between the effluent feed and the inlet to the reactor 22, a carbon dose is added as a biomass nutrient. The reactor 22 operates anaerobically to destroy sulphates and to convert heavy metals to insoluble sulphides for collection in a second cross-flow microfilter 23. Sulphates destroyed in the reactor 22 generate hydrogen sulphide gas which is passed into a photosynthetic reactor 24, and elemental sulphur is produced. From the microfilter 23, the heavy metal sulphides are removed through conduit 25 and the permeate passes through a collection tank 26 to an ion exchange unit 27 for boron removal. Treated water flows out at pipe 28.

EXAMPLE 1

A synthetic water, similar in composition to the average for farm drainage waters in the San Joaquin Valley, Calif., but with added phosphate, was treated using the plant illustrated in FIG. 1. In this and the following Examples, the pH of the feed water varied, but was always between 7.8 and 8.4. Relevant parts of the chemical analysis for this Example 1 were:

30 mg/l nitrate (expressed as nitrogen);
0.36 mg/l selenium (as the selenate ion, expressed as selenium);
4000 mg/l sulphate (expressed as sulphate);
20 mg/l phosphate (expressed as phosphorus).

The flow rate was 3 1/hr. The nutrient feed for the biomass was 5% methanol at a flow rate of 0.03 1/hr. For this Example, and Examples 2 and 3, the initial biomass was anaerobically digested sludge taken from the sewage works of the Thames Water Authority at Beddington, England. The reactor stages 3, 4 were operated at ambient temperature, about 20° C. The residence time in each of the reactor stages 3, 4 was about 3.0 hours. Each reactor stage 3, 4 had a voids volume of 10 liters.

The outflow was sampled at the exit of each of the reactor stages 3, 4. The liquid was filtered on a laboratory filter of about 5 micron pore size, the filtrate being dissolved or colloidal organic material with selenium and also dissolved inorganic selenium. The amount of dissolved inorganic selenium was The amount of dissolved inorganic selenium was determined. Further selenium was either retained in the reactor stages 3, 4 with the biomass (not measured) or evolved as gaseous selenium compounds (not measured).

With the flow rates indicated above, which are believed to be close to the optimum flow rates, there was a period during which biomass was generated and the efficiency of the reaction improved. At the end of the period, the relevant contents of the water at the outlet from each reactor stage 3, 4 were (mg/l):

|  | Reactor stage 3 | Reactor stage 4 |
| --- | --- | --- |
| Selenium in filtrate | 0.06 | 0.05 |
| inorganic | 0.005 | 0.005 |
| organic complexed | 0.055 | 0.045 |
| Held back on filter | not measured | 0.06 |
| Total Se in outflow | not measured | 0.11 |
| Nitrate (as N) | 0.6 | 0.4 |
| Sulphate (as SO4) | 4000 | 4000, unchanged |

The total held back and hence the total selenium in the outlet of reactor stage 3 were not measured.

EXAMPLE 2

Treated water from a two-stage reactor as in Example 1 was filtered through glass-fibre filter paper in order to remove suspended particles containing selenium (which in practice could be done on cross-flow filter 7 or by sand filtration). The water was aerated for an hour with activated sludge fed with glucose. By appropriate variation in the operating conditions, the supernatant after settling the sludge contained only 6 μg Se/l compared with 30 μg/l dissolved Se in the effluent from the two-stage reactor.

EXAMPLE 3

One laboratory reactor column was used in the up-flow mode, filled half-way with steel wool. The column cross-section was 2000 mm$^2$ and the volume filled with steel wool was 0.25 liters. The steel wool was a commercially available material. The threads of the wool were of finishing grade 4 or 5, having a diameter of 0.1 to 0.15 mm. The wool was made from a low carbon steel of the rimming variety, not silicon-killed, the steel of the rimming variety, not silicon-killed, the chemical composition being stated to be with the limits (% by weight): C 0.8–1.5; Mn 0.3–0.5; S 0.05 or more; P 0.05 or more The steel wool was inserted into the columns so as to fill the barrel of the column reasonably uniformly but without undue compaction of the wool. This gives a medium having enough void space to allow water to pass through readily but at the same time did not contain large passages which would permit short-circuiting and thus poor contact with the wool surfaces. The bulk density when in place is 60±10 kg/m$^3$.

A feed of 250 ml/hr was passed through the vessel (i.e. retention time one hour), the feed having the following composition (mg/l):

| SO$_4$ | 4000 |
| --- | --- |
| Cl | 1500 |
| Alkalinity (as CaCO$_3$) | 180 |
| Nitrate (as N) | 30 |
| Phosphate (as P) | 4 |
| Borate (as B) | 10 |
| Selenate (as Se) | 0.32 |
| 70% lactic acid (nutrient) | 5 |

Samples of the effluent water were taken over a period of 14 days. Results of analyses are as follows (concentrations in mg/l):

| Time after start up (days) | Selenium (as Se) | | Nitrate (as N) |
| --- | --- | --- | --- |
|  | Inorganic | Total Soluble |  |
| 1 | 0.22 | 0.26 | — |
| 9 | 0.005 | 0.025 | — |
| 10 | 0.006 | 0.016 | 7.0 (anomalous) |
| 13 | 0.004 | 0.030 | — |
| 14 | 0.006 | 0.017 | — |

EXAMPLE 4

Subsurface drainage water at Murietta Farms, Westlands Water District, near Mendota, Calif. USA, was treated using the plant of FIG. 2. The biomass was obtained from a local sewage works. Before treatment, the water analysis showed 109 ppm NO$_3$ (measured as nitrogen, n 3000–4500 ppm SO$_4$, 1800 Cl, 60 ppm B, 0.06 ppm Cr, and 0.35–0.45 mg/l Se, among other contaminants. After treatment, the selenium level was down to 3 to 5 ppb, along with impressive reductions in the level of nitrate, sulphate, heavy metals and boron.

EXAMPLE 5

A plant was constructed at Murietta Farms with three reactor stages and a cross-flow microfilter. The design capacity was 40 m$^3$/day. Each reactor had a volume of about 7 m$^3$. The first and second reactors were filled with stones of diameter 1.5 to 2 inches (say 3.8 to 5 cm), giving 35% porosity, while steel wool was used to fill the third reactor.

The drainage water as in Example 4 was fed at 30 l/m and supplemented with a nutrient comprising concentrated Steffen's waste liquor (a waste liquor from a sugar beet factory). Phosphate was added to the concentrated Steffen's waste liquor at the level of 2 mg/l, and the waste liquor was fed at a rate corresponding to 187 mg carbon per litre of drainage water.

Redox potentials were measured in order to assess the operating modes of the three reactors. The drainage water itself typically showed a redox potential in the range −20 to +20 mV, while the outflow from the first, second and third reactors were respectively in the ranges −100 to −140 mV, −140 to −175 mV, and −200 to −300 mV.

The treated water from the third reactor showed less than 1 ppm nitrate and less than 30 ppb selenium. The water from the cross-flow microfilter contained less than 15 ppb selenium, and was passed through a resin exchange column for a final polishing, giving an effluent containing less than 10 ppb selenium. Operation was sustained for more than 3 months.

EXAMPLE 6

Further modification of the plant employed for Example 5 is envisaged, particularly in view of the recent realisation that some of the selenium in the drainage water is being converted in the reactors to volatile organic selenium compounds such as methyl selenide.

Such compounds represent a useful source of selenium, and can readily be recovered by appropriate containment design of the plant. More generally, the aim is to construct a plant capable of treating 1 million U.S. gallons per day.

We claim:

1. A method of removing dissolved hexavalent selenium from water which contains a higher weight concentration of nitrate than of hexavalent selenium, comprising:
    lowering the concentration of nitrate in the water to 5 mg/l or below (measured as nitrogen);
    then treating the water in a reactor containing microbial biomass and a nutrient for the biomass, in the substantial absence of free oxygen, to cause the selenium to be captured as particles larger than the forms of selenium originally present; and
    passing the discharge from the reactor through a filter in order to filter out particles with captured selenium.

2. The method of claim 1, wherein said water contains a high concentration of sulphate which is substantially greater than the concentration of selenium, and in which the method is operated so that the sulphate concentration is essentially maintained.

3. The method of claim 1, wherein nitrate is initially added to said water, the nitrate concentration subsequently being reduced by microbial mass prior to causing the selenium to be captured by said particles.

4. The method of claim 1, wherein said reactor contains microbial biomass in a non-homogeneous bed in which various differing levels of reducing activity occur.

5. The method of claim 4, wherein said lowering of nitrate concentration is effected using biomass.

6. The method of claim 5, wherein said lowering of nitrate concentration is effected in an anoxic reaction.

7. The method of claim 5, wherein said biomass for lowering of nitrate concentration and said biomass in said reactor are the same biomass.

8. The method of claim 5, wherein said reactor is selected from the group consisting of fluidised bed reactors, sludge-blanket reactors, stirred reactors and fixed bed reactors.

9. The method of claim 5, wherein said biomass in said reactor comprises facultative biomass.

10. The method of claim 1, wherein said reactor comprises at least two stages.

11. The method of claim 1, wherein said hexavalent selenium is converted into a removable form of selenium selected from the group consisting of recoverable volatile organic selenium compounds, recoverable volatile inorganic selenium compounds, elemental selenium, entrainable organically-complexed selenium compounds, entrainable tetravalent selenium compounds, entrainable bivalent selenium compounds, and mixtures thereof.

12. The method of claim 1, wherein said water containing hexavalent selenium contains nitrate in the range from 25 to 250 mg/l (measured as nitrogen, and said step of treating said water in said reactor with said biomass gives water containing 2 mg/l or less nitrate.

13. The method of claim 12, wherein said water containing hexavalent selenium also contains from 500 to 10000 mg/l sulphate.

14. The method of claim 12, wherein said water containing hexavalent selenium contains 0.2 to 0.5 mg/l selenium.

15. The method of claim 14, wherein the step of treating said water in said reactor with said biomass gives water containing selenium at 10% or less of the original concentration.

16. The method of claim 1, wherein the filtered water contains 30 μg/l or less of selenium.

17. A method of removing dissolved selenium from water which contains a higher weight concentration of nitrate than of hexavalent selenium, said method comprising the steps of:
    providing a reactor containing microbial biomass capable of converting dissolved selenium to a removable form of selenium;
    rectifying any nutritional deficiencies in said water to render it nutritionally adequate and capable of sustaining said biomass;
    treating said nutritionally adequate water with said biomass in said reactor in the substantial absence of free oxygen, said treating step causing said nitrate to be lowered to a level of 5 mg/l or below (measured as nitrogen) and causing said selenium to be converted to at least one removable form, and
    removing said removable selenium from said water.

* * * * *